(12) United States Patent
Freedman et al.

(10) Patent No.: US 11,995,692 B2
(45) Date of Patent: *May 28, 2024

(54) SYSTEMS, METHODS, AND MEDIA FOR DETECTING ADVERTISEMENTS WITH ADVERTISING CUES

(71) Applicant: Integral Ad Science, Inc., New York, NY (US)

(72) Inventors: Micah Freedman, New York, NY (US); Moshe Silberman, Brooklyn, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,612

(22) Filed: Dec. 17, 2021

(65) Prior Publication Data

US 2022/0253908 A1    Aug. 11, 2022

Related U.S. Application Data

(63) Continuation of application No. 13/749,472, filed on Jan. 24, 2013, now Pat. No. 11,205,200.

(60) Provisional application No. 61/639,023, filed on Apr. 26, 2012, provisional application No. 61/590,312, filed on Jan. 24, 2012.

(51) Int. Cl.
*G06Q 30/0241* (2023.01)

(52) U.S. Cl.
CPC .............................. *G06Q 30/0277* (2013.01)

(58) Field of Classification Search
None
See application file for complete search history.

(56) References Cited

U.S. PATENT DOCUMENTS

| | | | |
|---|---|---|---|
| 6,009,409 A | 12/1999 | Adler et al. | |
| 9,037,963 B1 | 5/2015 | Chandi et al. | |
| 2005/0278736 A1* | 12/2005 | Steelberg | G06Q 30/0267 725/35 |
| 2008/0288983 A1* | 11/2008 | Johnson | H04N 21/812 725/46 |

(Continued)

OTHER PUBLICATIONS

Notice of Allowance dated Aug. 13, 2021 in U.S. Appl. No. 13/749,472, pp. 2-6.

(Continued)

*Primary Examiner* — Chrystina E Zelaskiewicz
(74) *Attorney, Agent, or Firm* — Byrne Poh LLP

(57) ABSTRACT

Systems, methods, and media for detecting advertisements with advertising cues are provided. In some embodiments, a method for detecting advertisements is provided, the method comprising: receiving an advertisement request from a web browser loading a web page; selecting an advertisement from a plurality of advertisements to be placed on the web page in response to receiving the advertisement request; loading an event listener associated with the advertisement that receives advertisement information associated with other advertisements on the web page; and transmitting advertisement information associated with the advertisement to frames on the web page, wherein the event listener receives responses to the advertisement information that includes the advertisement information associated with the other advertisements on the web page.

20 Claims, 11 Drawing Sheets

(56) References Cited

U.S. PATENT DOCUMENTS

| | | | |
|---|---|---|---|
| 2009/0064183 A1 | 3/2009 | Chijiiwa et al. | |
| 2009/0265243 A1 | 10/2009 | Karassner et al. | |
| 2009/0328063 A1 | 12/2009 | Corvera et al. | |
| 2010/0010884 A1 | 1/2010 | Cohee et al. | |
| 2011/0106634 A1 | 5/2011 | Luttrell et al. | |
| 2011/0125594 A1 | 5/2011 | Brown et al. | |
| 2011/0231265 A1* | 9/2011 | Brown | G06Q 30/0277 |
| | | | 705/14.73 |
| 2012/0084641 A1* | 4/2012 | Chung | G06Q 30/0241 |
| | | | 715/240 |
| 2012/0185343 A1* | 7/2012 | Jones | G06Q 30/0277 |
| | | | 705/14.73 |

OTHER PUBLICATIONS

Office Action dated Mar. 1, 2018 in U.S. Appl. No. 13/749,472, pp. 2-27.
Office Action dated May 8, 2019 in U.S. Appl. No. 13/749,472, pp. 2-24.
Office Action dated May 26, 2015 in U.S. Appl. No. 13/749,472, pp. 2-18.
Office Action dated Jun. 7, 2013 in U.S. Appl. No. 13/749,472, pp. 2-15.
Office Action dated Nov. 25, 2020 in U.S. Appl. No. 13/749,472, pp. 2-14.
Office Action dated Dec. 13, 2013 in U.S. Appl. No. 13/749,472, pp. 2-18.

\* cited by examiner

Frames on Page
0. base-level page (e.g., top-level window)
1. non-nested advertisement
2. widget with two sub-frames
3. three-level nested advertisement with customized advertisement tag
4. two-level nested advertisement with customized advertisement pixel tag

SYSTEMS, METHODS, AND MEDIA FOR DETECTING ADVERTISEMENTS WITH ADVERTISING CUES

CROSS-REFERENCE TO RELATED APPLICATIONS

This application is a continuation of U.S. patent application Ser. No. 13/749,472, filed Jan. 24, 2013, which claims the benefit of U.S. Provisional Patent Application No. 61/590,312, filed Jan. 24, 2012, and U.S. Provisional Patent Application No. 61/639,023, filed Apr. 26, 2012, each of which is hereby incorporated by reference herein in its entirety.

TECHNICAL FIELD

The disclosed subject matter relates to systems, methods, and media for detecting advertisements with advertising cues.

BACKGROUND

Media content, such as advertisements, is created with the goal of having the content viewed, listened to, or otherwise received by a target audience. The target audience may be, for example, one or more users with a set of particular interests or one or more of users falling in a particular demographic or psychographic group. However, distributing such media content to the desired audience is a difficult process. It is often difficult for brand managers, advertisement networks, publishers, advertisers, and/or advertising agencies (collectively referred to herein as "advertisers") to control and manage the service of their advertisements.

There is therefore a need in the art for approaches for controlling and managing the distribution of advertisements for publication on web pages and web sites. Accordingly, it is desirable to provide methods, systems, and media that overcome these and other deficiencies of the prior art.

SUMMARY

In accordance with various embodiments mechanisms for detecting advertisements with advertising cues are provided.

In accordance with some embodiments, a method for detecting advertisements is provided, the method comprising: receiving, using a hardware processor, an advertisement request from a web browser loading a web page; selecting, using the hardware processor, an advertisement from a plurality of advertisements to be placed on the web page in response to receiving the advertisement request; loading, using the hardware processor, an event listener associated with the advertisement that receives advertisement information associated with other advertisements on the web page; and transmitting, using the hardware processor, advertisement information associated with the advertisement to frames on the web page, wherein the event listener receives responses to the advertisement information that includes the advertisement information associated with the other advertisements on the web page In some embodiments, the method further comprises determining whether to block the selected advertisement from being placed on the web page based on the advertisement information associated with the other advertisements on the web page.

In some embodiments, in response to determining to block the selected advertisement, the method further comprises causing a newly selected advertisement from the plurality of advertisements to be placed on the web page in place of the selected advertisement.

In some embodiments, in response to determining to block the selected advertisement, the method further comprises inhibiting the selected advertisements from being loaded on the web page.

In some embodiments, blocking comprises replacing the selected advertisement with a second selected advertisement after the selected advertisement has loaded on the web page.

In some embodiments, the information about the other advertisements includes at least one of: advertiser identification information, campaign identification information, advertisement placement information, and information relating to whether a response was received from advertisements on the web page.

In some embodiments, the method further comprises loading an event handler associated with the web page, wherein the event handler receives an identification message that identifies the selected advertisements and, in response, transmits a response to the identification message that includes information about another advertisement on the web page.

In some embodiments, the method further comprises recursively walking through each of the frames on the web page, wherein an identification message that identifies the selected advertisement is transmitted to each of the frames.

In some embodiments, the method further comprises determining approved advertisements associated with the web page based on one or more identification messages received from the advertisements.

In some embodiments, the method further comprises loading an unload handler associated with the selected advertisement that collects additional advertisement information from additional advertisements that loaded later in time than the selected advertisement and transmits the additional advertisement information to an advertisement server.

In accordance with some embodiments, a system for detecting advertisements is provided. The system comprises a hardware processor that is configured to: receive an advertisement request from a web browser loading a web page; select an advertisement from a plurality of advertisements to be placed on the web page in response to receiving the advertisement request; load an event listener associated with the advertisement that receives advertisement information associated with other advertisements on the web page; and transmit advertisement information associated with the advertisement to frames on the web page, wherein the event listener receives responses to the advertisement information that includes the advertisement information associated with the other advertisements on the web page.

In accordance with some embodiments, a non-transitory computer-readable medium containing computer-executable instructions that, when executed by a processor, cause the processor to perform a method for detecting advertisements, is provided. The method comprising: receiving an advertisement request from a web browser loading a web page; selecting an advertisement from a plurality of advertisements to be placed on the web page in response to receiving the advertisement request; loading an event listener associated with the advertisement that receives advertisement information associated with other advertisements on the web page; and transmitting advertisement information associated with the advertisement to frames on the web page, wherein the event listener receives responses to the advertisement information that includes the advertisement information associated with the other advertisements on the web page.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
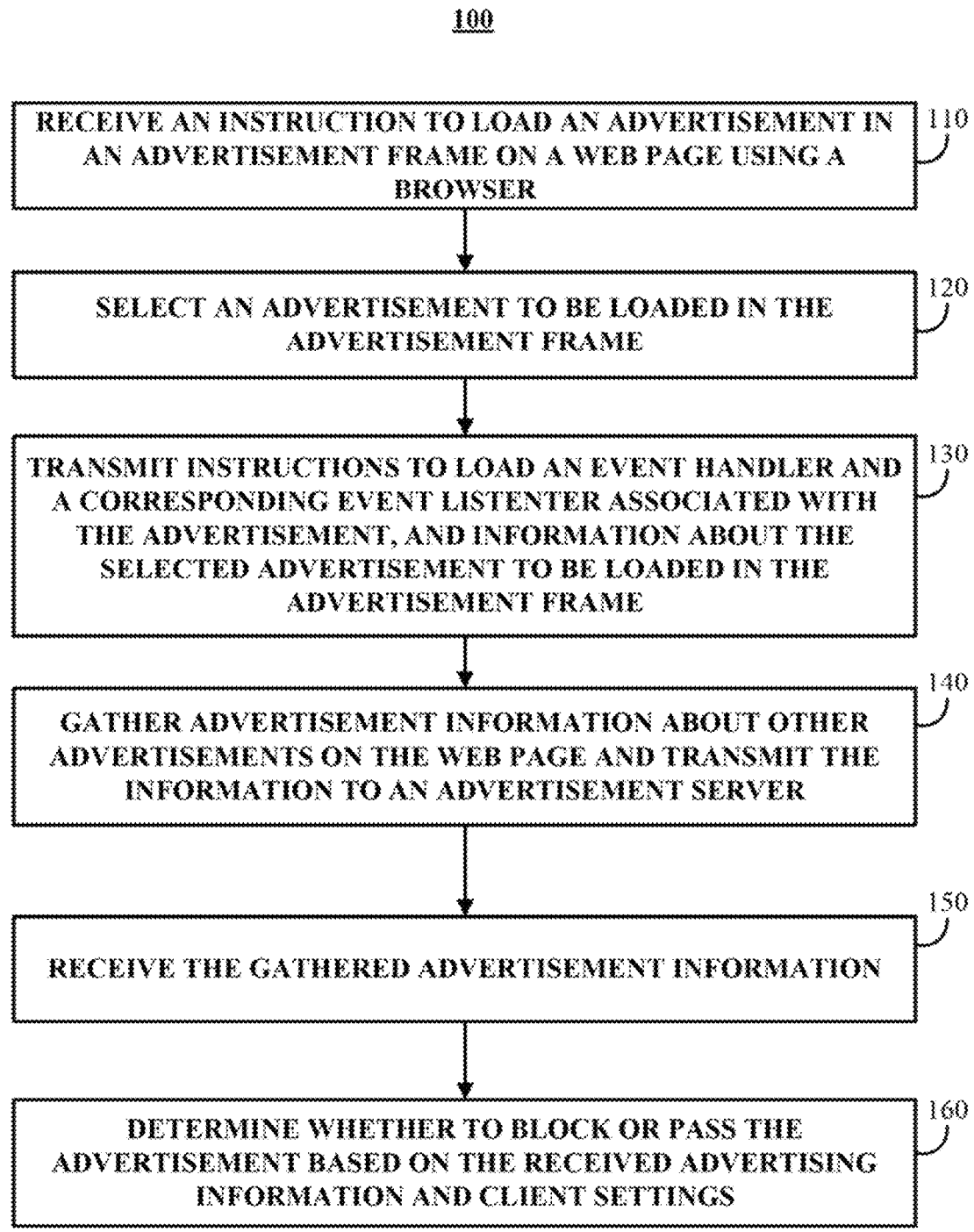
FIG. 1 shows an illustrative example of a process for detecting advertisements with advertising cues in accordance with some embodiments of the disclosed subject matter.

In accordance with various embodiments mechanisms for detecting advertisements with advertising cues are provided. These mechanisms can include using advertising cues that provide an advertisement identification message. Using these advertising cues and advertisement identification messages, these mechanisms can exchange information between advertisements through an event listener, a message transmitter, an event handler, and/or an unload handler. These mechanisms can then transmit the exchanged advertisement information to an advertisement server that determines whether to pass an advertisement, block an advertisement, transmit a different advertisement, etc. Such an advertisement server can be a publisher advertisement server, a marketer advertisement server, a demand side platform, a supply side platform, an advertisement network, a real-time bidding exchange, or any suitable combination thereof.

These mechanisms can be used in a variety of applications. For example, these mechanisms can be used by a competing advertiser or a different advertisement server to determine whether to place an advertisement on a web page based on already placed or already served advertisements. In a more particular example, an advertisement server that is placing advertisements relating to American Airlines can detect advertisements that are shown on the web page. In the case where the advertisement server does not want to place an advertisement relating to American Airlines when an advertisement relating to JetBlue Airways has been presented on the same page (that may be provided by another advertisement server), the advertisement server can use the exchanged information to block the advertisement from being presented (competitive blocking). In the case where the advertisement server wants to place an American Airlines advertisement on the same page as the JetBlue Airways advertisement, the advertisements server can use the exchanged information to pass the advertisement (competitive targeting).

In another more particular example, an advertisement server can use the exchanged information to determine whether multiple advertisements relating to a client (e.g., American Airlines) have been placed on the same page. The client can provide desired settings as to how their advertisements are served (e.g., only one per web page, a desired percentage per website, etc.). In yet another example, an advertisement server can use the exchanged information to determine information relating to other advertisements that have been placed on the page. Such information can include identification information about other brands advertising on the same page, information regarding the nature of advertisements on the page, etc. In still another example, the a response received from another advertisement can include, for example, a password, pass key, etc. which can be used to verify the information from the other advertisement, as well as prevent fraud.

Generally speaking, these mechanisms provide an advertisement guidance application (sometimes referred to herein as "the application") for detecting advertisements. More particularly, the application uses an event listener to listen for messages from other advertisements, a message transmitter to transmit messages to frames on a page, and an event handler to detect other advertisements and transmit advertisement identification messages within one or more web pages.

In some embodiments, the advertisement guidance application can receive an instruction to load an advertisement from a web browser loading a web page that contains instructions to load one or more advertisements. In general, a web page can contain content as well as instructions to load one or more advertisements. The instructions to load one or more advertisements can be, for example, an advertisement call or advertisement tag that instructs a web browser to request an advertisement from an advertisement server. In some cases, these instructions can be included in a frame within the web page, which can be an inline frame (iframe) that can allow documents from domains other than the domain of the web page to be loaded within the web page. Upon loading the web page, a web browser can request advertisements in response to the instructions contained in one or more iframes. For example, a user can navigate to a web page which can have instructions for loading advertisements in four frames of various sizes throughout the web page.

In some embodiments, an advertisement guidance application can select an advertisement to load on the web page in response to receiving a request to load an advertisement. The advertisement can be selected using any suitable techniques. For example, information about the content of the web page can be used to select an advertisement to be placed on the web page (e.g., content of the web page, traffic numbers for the web page, etc.), demographic or psychographic characteristics of a user of the web browser can be used to select an advertisement to be placed on the web page, an advertisement to be placed on the web page can be selected based on a number of impressions to be delivered for a particular advertisement, etc.

In some embodiments, the advertisement guidance application can cause an event handler and an event listener to be loaded on the web page for exchanging information with other advertisements on the web page. For example, the frame that requested that the advertisement be loaded, the event handler and/or the event listener can send an advertising cue (e.g., an identification message) to other frames in the web page. More particularly, a function such as window.postMessage can be used to send a message to other frames (e.g., other iframes) within the web page. In some embodiments, communication between frames in a web page can include communication through a top-level window that contains the frames. Additionally, information about a selected advertisement can be transmitted to the web page to be used in exchanging advertisement information about selected advertisements with other advertisement frames. In some cases, the selected advertisements can be transmitted and/or loaded while information about the advertisements is being exchanged. In other cases, the selected advertisements are not transmitted and loaded until the advertisement guidance application determines that the selected advertisement should be passed.

In some embodiments, the advertisement guidance application can receive information about the advertisements that was gathered using the event handler and/or the event listener. For example, advertisement information (e.g., metadata) regarding the other advertisements that are loaded or will be loaded on the web page can be received by the advertisement guidance application.

In some embodiments, advertisement information about a selected advertisement and other advertisements on the web page can be used by the advertisement guidance application to determine whether to block the selected advertisement from being displayed on the web page or to pass the advertisement. For example, if the advertisement guidance application determines that the selected advertisement should be blocked, the advertisement guidance application can inhibit the advertisement from being transmitted to the web browser. In another example, if the selected advertisement has already been loaded, the advertisement guidance application can cause a new advertisement or other suitable content to be loaded in place of the selected advertisement. In some instances, this can be performed during a time between when a web page is requested and when a user is able to view content of the web page (e.g., while the web page is loading).

Turning to FIG. 1, an example of a process 100 for detecting advertisements and exchanging advertisement information is shown in accordance with some embodiments of the disclosed subject matter. As shown, the advertisement guidance application begins by receiving an instruction (or request) to load an advertisement in an advertisement frame on a web page at 110. The instruction to load an advertisement can be received from any suitable source. For example, a user can instruct a web browser to load a particular web page (e.g., by entering a uniform resource locator (URL), by selecting a hyperlink, etc.), and the web page can send an instruction from a particular frame to load an advertisement. In some embodiments, sending an instruction to load an advertisement can involve transmitting a request to an advertisement server that stores one or more advertisements. In some embodiments, the advertisement server can count the number of impressions for advertisements that are served to each web page, which may relate to how much the web page presenting the advertisement to the user is paid by the advertiser.

Figure 3A:
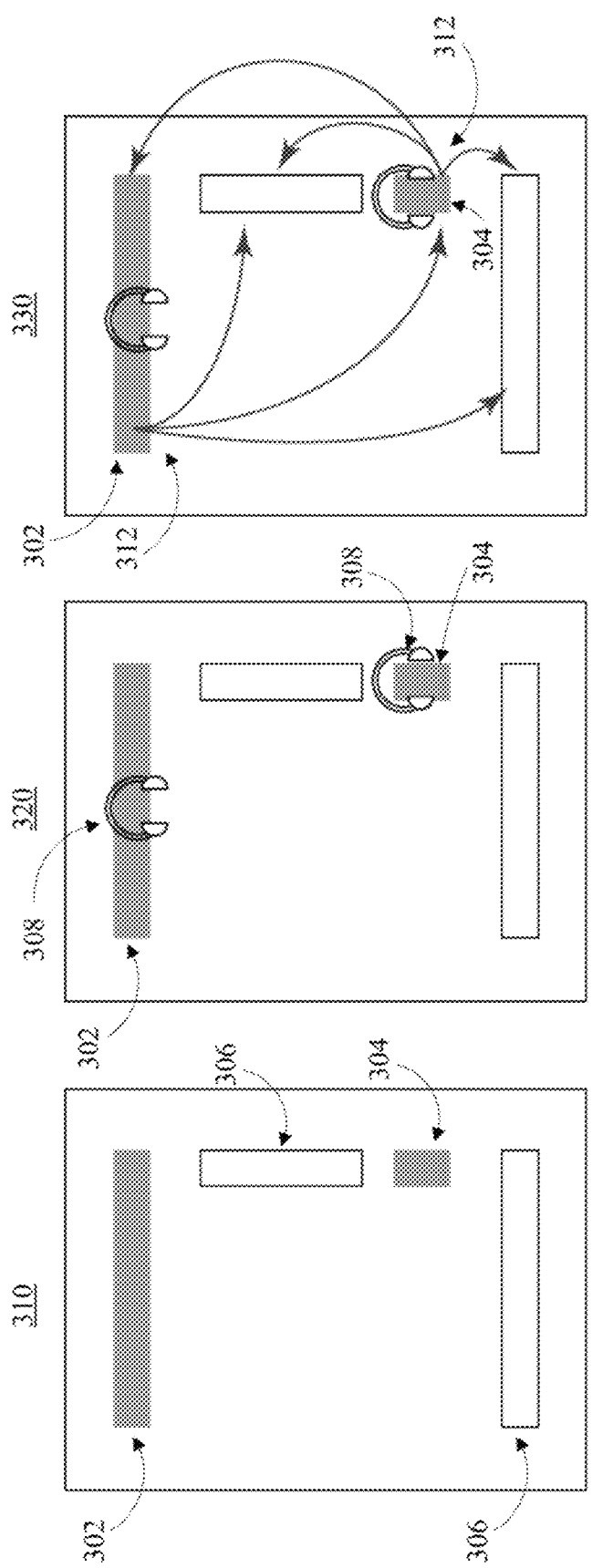
FIGS. 3A and 3B show diagrams illustrating an example of a process for detecting advertisements with advertising cues in accordance with some embodiments of the disclosed subject matter.

More particularly, as shown in window 310 of FIG. 3A, in response to receiving a request to load a particular web page, the web page requests advertisements in one or more advertisement frames (e.g., shown as frames 302, 304 and 306). The advertisements requested by some of these advertisement frames, such as advertisement frames 302 and 304, can be approved advertisements which can incorporate the mechanisms described herein and/or advertisements rated, qualified, and/or endorsed by any suitable advertising entity. For example, as described herein, frames 302 and 304 can send messages to other advertisements loaded on the web page, wait for a response, and send information to an advertisement server to assist the advertisement server in making decisions regarding whether to load an advertisement in frame 302 and/or 304. Additionally, some of these frames, such as frames 306, can correspond to advertisements that are not approved advertisements and are not compatible with the mechanisms described herein.

Returning to FIG. 1, in response to receiving the instruction (or request) to present an advertisement, the advertisement guidance application can select an advertisement to be loaded in the advertisement frame at 120. Any suitable technique can be used to select an advertisement to be loaded in the advertisement frame that requested an advertisement (e.g., frame 302). For example, information about the content of the web page can be used to select an advertisement to be placed on the web page (e.g., content of the web page, traffic numbers for the web page, a size of the advertisement frame, etc.). As another example, demographic or psychographic characteristics of a user of the web browser can be used to select an advertisement to be placed on the web page. As yet another example, an advertisement to be placed on the web page can be selected based on a number of impressions to be delivered for a particular advertisement.

At 130, the advertisement guidance application can transmit instructions to the advertisement frame to load an event handler and a corresponding event listener associated with the selected advertisement to be loaded. The advertisement guidance application can also transmit information about the selected advertisement (e.g., advertisement metadata) at 130. As described below in connection with FIG. 3A, information about the advertisement can include advertiser information, campaign information, etc.

In response to the instructions to load the event handler and event listener, the web browser that loaded the web page can load an event handler and event listener for the advertisement frame (e.g., frame 302). As shown more particularly in window 320 of FIG. 3A, an event handler (not shown) and a corresponding event listener (represented by icon 308) can be loaded for frames 302 and 304. Event listener 308 can wait for messages sent by other frames (e.g., other advertisements on the web page). For example, event listener 308 associated with frame 302 can listen for messages transmitted from other frames on the web page, such as frame 304, which may or may not have loaded an advertisement. In a more particular example, an event listener associated with a particular advertisement frame can listen for a message or cue from another advertisement frame. The message or cue can be text, such as "I am an approved advertisement," or any suitable text. In some embodiments, a format of an incoming message can be checked to determine whether it matches an expected format. Messages that do not match the expected format can be rejected and/or ignored.

In some embodiments, messages can be sent between advertisements using any suitable techniques. For example, in some embodiments, messages can be sent between iframes by sending messages through a higher level window that contains both iframes, such as a top-level window. In another example, messages can be sent from an event handler in one browser window to advertisements (e.g., iframes) located in different windows and/or different tabs of a web browser application in which the advertisements are loaded.

It should be noted that, in some embodiments, the advertisement selected at 120 can be transmitted to be loaded on the web page at 130. In such embodiments, the advertisement can be loaded and then replaced or blocked after loading, rather than waiting until the information has been gathered to determine whether to block or pass the advertisement.

Referring back to FIG. 1, at 140, advertisement information about other advertisements loaded (or selected to be loaded) on the web page can be gathered and transmitted to an advertisement server. In some embodiments, the advertisement information can be gathered by exchanging advertisement information among frames corresponding to approved advertisements using the event handler and event listener loaded in response to the instructions transmitted at 130.

Figure 2:
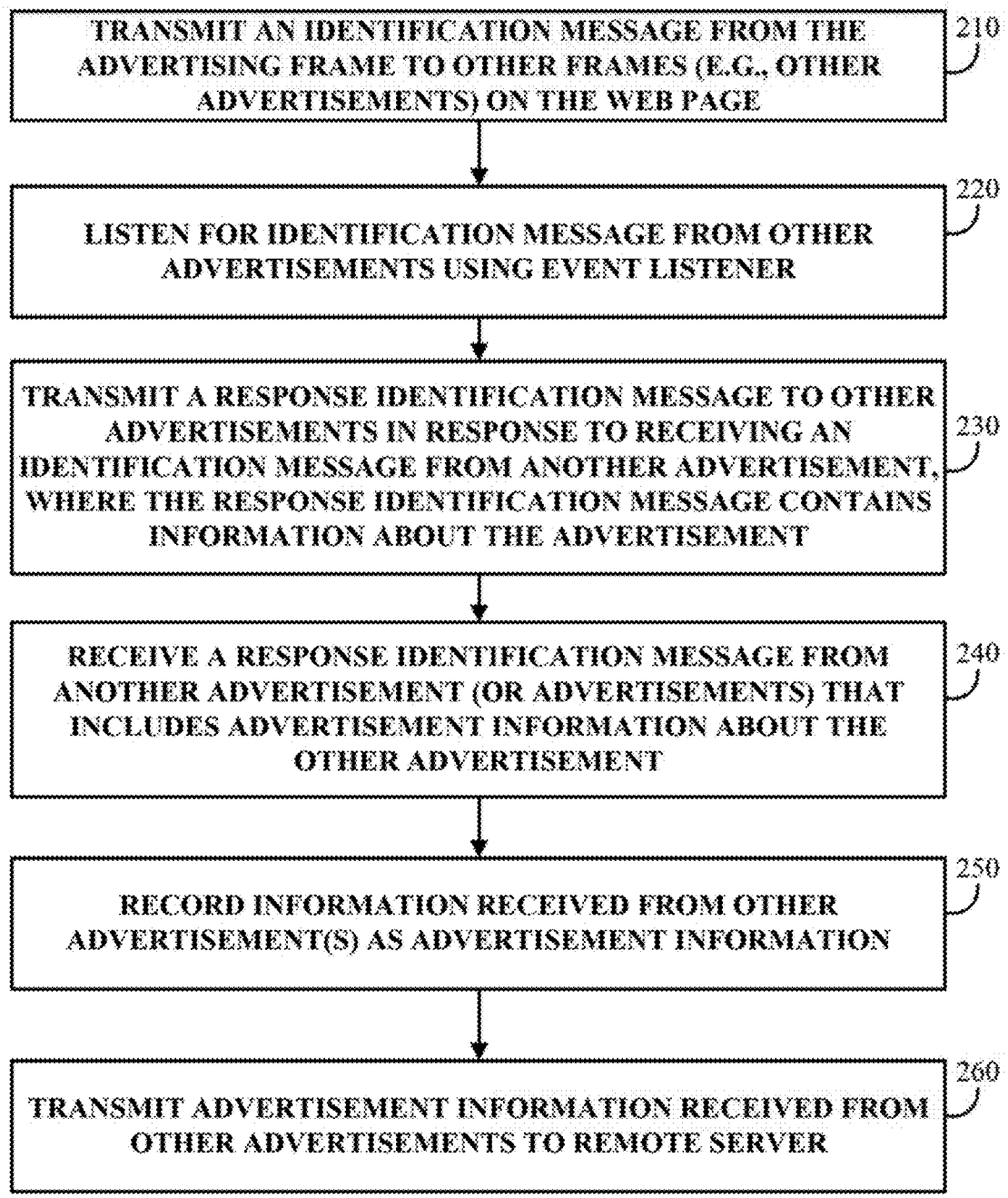
FIG. 2 shows an illustrative example of a process for exchanging information between advertisements with advertising cues in accordance with some embodiments of the disclosed subject matter.

FIG. 2 shows an illustrative flow diagram 200 for gathering information about other advertisements loaded (or selected to be loaded) on the web page loaded in the web browser in accordance with some embodiments of the disclosed subject matter. At 210, an identification message can be sent from a first advertising frame on the web page to one or more other frames on the web page. As described above, the identification message can be text, such as, "I am an approved advertisement," or any other suitable text. In some embodiments, the identification message can also contain additional information, such as, an identification number, a password or pass phrase, etc., that can be used to identify the advertisement frame as an approved advertisement. Such additional information can be used to verify the origin of the other advertisements and/or the information sent from such other advertisements. Additionally, the identification message can contain a domain associated with the advertising frame sending the message.

In some embodiments, the event handler, the event listener, a message transmitter, or any other suitable component associated with the advertisement or advertisement frame can transmit a message to advertisements in other frames on the web page. For example, as shown in window 330 of FIG. 3A, using window.postMessage or any other suitable HTML application program interface for transmitting data messages, the message transmitter can recursively walk through iframes or any other suitable elements in the page and transmit a message. Upon recursively walking through the iframes in the page, the message transmitter can transmit an advertising cue, such as, "I am an approved advertisement." For example, as shown in window 330 of FIG. 3A, the message transmitter associated with an advertisement can transmit an advertisement identification message 312 (e.g., "I am an approved advertisement") to each other advertisement on the page. Additionally or alternatively, the message can be encrypted such that the message can only be understood by an event listener that has access to a key to decrypt the message.

At 220, the event listener associated with the advertising frame can listen for identification messages from other advertisements and/or other advertisement frames on the web page. For example, as shown in windows 320 and 330 of FIG. 3A, event listener 308 associated with advertisement frame 302 can listen for identification messages from other advertisements (or advertisement frames) on the web page. Likewise, event listener 308 associated with advertisement frame 304 can listen for identification messages from other advertisements (or advertisement frames) on the web page.

In response to receiving an identification message from another advertisement (or advertisement frame), the event handler can respond to such identification messages at 230. For example, the event handler can cause a response identification message to be transmitted to the advertisement (or advertising frame) that transmitted the identification message. The response identification message can contain any suitable information about the advertisement to be loaded (or which has been loaded) in the advertisement frame sending the response identification message. For example, the response identification message can contain advertiser information (e.g., advertiser name, source, link, etc.), campaign information (e.g., campaign identification information), advertisement placement information (e.g., location on the page, browser configuration, screen resolution, etc.), and/or any other suitable information.

At 240, the advertisement frame can receive a response identification from another advertisement (or advertisement frame) that includes advertisement information about the other advertisement (or an advertisement to be loaded in the advertisement frame). The advertising frame can receive a response identification message from each advertisement (or advertisement frame) on the web page that has loaded an event listener and/or an event handler in accordance with the mechanisms described herein. As described above, the advertisement information can include advertiser information, campaign information, advertisement placement information, and/or any other suitable information.

In some embodiments, information on a total number of advertisements and/or frames on the web page can be gathered. For example, a number of identification messages sent can be used to represent a total number of advertisements on the web page.

As shown in window 330 of FIG. 3A (and described above), each advertisement frame loaded with an event handler (not shown) and an event listener 308 (e.g., frames 302 and 304) can transmit an identification message 312 to each other frame on the web page. In response, as shown in window 340 of FIG. 3B, each advertisement that received an identification message 312 can transmit a response identification message 314 back to the advertisement (or advertisement frame) that sent the original identification message 312. In the example of window 240, frames 302 and 304 exchange response identification messages 314.

At 250, the advertisement information received from other advertisements can be stored by the event handler associated with the advertising frame. For example, the advertisement information received at 240 can be stored in a cache associated with the browser as the advertisement information is received.

At 260, the advertisement frame can cause the advertisement information received from other advertisements on the web page to be transmitted to a remote server. Such a remote server can include the advertisement server that caused the event handler and event listener to be loaded, a data server for storing data, a server that received the instruction to load an advertisement at 110, a server that intercepted such an instruction, any other suitable server, or any suitable combination thereof. For example, in some embodiments, as shown in window 350 of FIG. 3B, the event handler associated with the advertisement (e.g., advertisement 302) can send information received with the response identification message at 140 (e.g., information about advertisement 304) to the advertisement server as a message 316-1. Likewise, the event handler associated with another advertisement (e.g., advertisement 304) can send information received from the advertisement (e.g., advertisement 302) to an advertisement server (which may be the same advertisement server that message 316-1 was sent to or a different advertisement server) as a message 316-2. More particularly, the advertisement information associated with particular advertisements on a page can be transmitted to one or more servers by appending the information (e.g., as a message 316) to redirection instructions and/or any other suitable advertisement verification tags into advertisement calls. Redirection features are further described, for example, in commonly owned, commonly assigned U.S. Patent Application Publication No. 2011/0106634, which is hereby incorporated by reference herein in its entirety. Additionally, if the advertisement (e.g., advertisement 302) does not receive any response identification messages, the absence of approved advertisements can be transmitted to the advertisement server.

It should be noted that, in some embodiments, information can be gathered from advertisements located anywhere within a web page or web site on which an advertisement selected at 120 is loaded or is to be loaded, or advertisements that are located within other instances of a browser application, within other tabs of a browser application. For example, information can be gathered from advertisements in different frames at the same level of a hierarchy as a frame within which the selected advertisement is loaded or to be loaded. As another example, information can be gathered from within the frame in which the advertisement is loaded or to be loaded using any suitable techniques. As yet another example, information can be gathered from frames at a different level of a hierarchy as a frame within which the selected advertisement is loaded or to be loaded, such as a top-level frame, a parent frame, a child frame, etc.

Referring back to FIG. 1, at 150, the advertisement guidance application can receive the advertisement information sent by the advertisement frame at 140. For example, the advertisement guidance application can receive message 316-1 from advertisement frame 302 that includes information about an advertisement to be loaded (or already loaded) in advertisement frame 304. It should be noted that the information received at 150 can be stored and/or analyzed to determine various properties of a particular web page on which the advertisement loaded and/or may be loaded. For example, information on other advertisements loaded on a web page can be stored. As another example, a number of frames within a particular web page can be stored. As yet another example, a proportion of frames that contain an advertisement using the mechanisms described herein can be stored. As still another example, information regarding how often advertisements are changed (e.g., how often advertisements reload) on the page on which the advertisement loaded can be stored. As a further example, information from a web page on which an advertisement appeared can be stored as together such that it can be determined at a later time which advertisements existed on the same web page at the same time. As another further example, information regarding a frame in which an advertisement is loaded (or is to be loaded) and that frame's position within a hierarchy, such as a position with a frame tree, can be stored along with information about the position of other frames position within the hierarchy. Such information can be used, for example, to determine a quality of advertisements placed on a particular web page, an average amount of time that advertisements are loaded, a number of advertisements on a page, cost effectiveness of an advertisement campaign by a particular advertiser, to verify that advertisements appeared on web pages on which the advertiser intended advertisements to be placed on, etc.

At 160, the advertisement guidance application can determine whether to block or pass the advertisement based on the advertising information received at 150 and client settings related to the advertisement. For example, the advertisement server can receive the advertising information and determine whether to block the advertisement from being loaded or pass the advertisement and cause the advertisement to be loaded on the web page based on client settings. It should be noted that blocking is intended to include inhibiting the advertisement from being transmitted, as well as loading the advertisement on the web page and subsequently removing or replacing the advertisement if the advertisement guidance application determines that the advertisement should be blocked at 160. For example, if the advertisement guidance application determines that the advertisement selected at 120 should be blocked, a new advertisement can be transmitted to replace the advertisement that has already been loaded. As another example, if the advertisement guidance application determines that the advertisement selected at 120 should be blocked, instructions can be sent to unload the advertisement that was selected at 120 and to call for a new advertisement from any suitable location such as a real-time bidding application, a server for storing public service announcements, etc.

In some embodiments, client settings can include, for example, competitive blocking instructions that direct the advertisement server to block the advertisement if an advertisement from a competitor in the same industry has placed an advertisement on the same page, competitive targeting instructions that direct the advertisement server to pass the advertisement if an advertisement from a competitor in the same industry has placed an advertisement on the same page, count instructions that direct the advertisement server to provide a particular number or percentage of particular advertisements associated with the client on a page, etc. More particularly, the client (e.g., an advertiser) can provide settings such that the same advertisement is not presented multiple times or multiple times within a given time period on a page. In doing this, the client can control costs associated with the presentation of their advertisements.

Figure 3B:
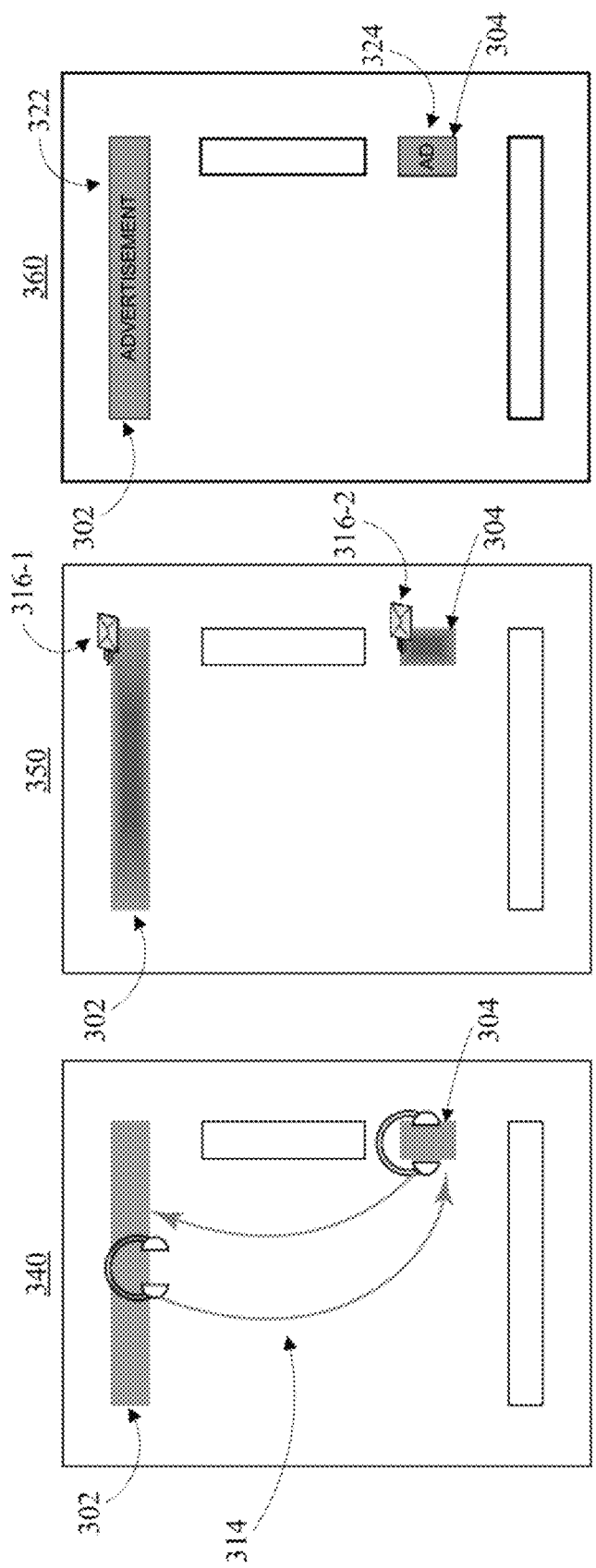

As shown in window 360 of FIG. 3B, if the advertisement guidance application passes the advertisement, an advertisement 322 (e.g., a creative such as an image, a video, text, sound, a combination thereof, etc.) can be loaded in advertising frame 302. A similar decision regarding advertisement frame 304 can be made by the advertisement guidance application about whether to block or pass the advertisement (on the same advertising server or a different advertising server), and if an advertisement is passed for advertisement frame 304, an advertisement 324 can be loaded in advertisement frame 304.

In some embodiments, an unload handler can be set up for an advertisement that allows additional information that is collected from advertisements that loaded later in time to be transmitted to the advertisement server or any other suitable server. For example, the advertisement server can receive information related to advertisement identification messages between advertisements that load after the advertisement is initially loaded. More particularly, if the advertisement receives an identification message after the advertisement has been passed to the web page and loaded, the advertisement can then send an identification message back to the advertisement that transmitted the identification message. As described above in connection with FIGS. 1 to 3, the advertisement can receive a response identification message that contains information about another advertisement that is loaded after the advertisement is passed (e.g., after the advertisement loaded in response to the request at 110 has already been loaded). This information about the advertisement that was loaded later can be sent to the advertisement server (or any other suitable server) upon receipt of the information or can be stored and sent to the advertisement server (or any other suitable server) by the unload handler upon the advertisement and/or web page being unloaded (e.g., navigated away from, closed, refreshed, etc.).

In some embodiments, the unload handler can transmit the exchanged information and/or any other information gathered in association with the advertisement (e.g., advertisement viewability information, advertisement placement information, parent domain information, etc.) with which the unload handler is associated at any suitable time. For example, the unload handler can transmit such information to an advertisement server periodically. As another example, the unload handler can transmit such information in response to an event, such a before unload event, an unload event, a reload event, etc.

It should be noted that although information is generally described as flowing from the advertisement to an advertisement server, the advertisement server and/or any other suitable source can transmit information to the advertisement at any suitable time. For example, an advertisement server can transmit instructions to transmit information back to the advertisement server in response to an external event, such as the advertisement being loaded on a different web page. As another example, the advertisement server can transmit instruction to resend a message to other frames on the web page.

As described above, the advertisement guidance application can be used in any suitable application. For example, the advertisement server can use the advertisement information to determine advertising shares or counts. In a more particular example, the advertisement guidance application can be used by the advertisement server to block an advertisement if more than one advertisement from a single brand or single advertiser has been presented on a page. In another example, the advertisement guidance application can be used by the advertisement server to detect whether multiple advertisements were served on a page and to transmit a report when the multiple advertisements were not presented. In yet another example, the advertisement guidance application can be used by the advertisement server to provide advertisements in accordance with client settings (e.g., one advertisement per page, one of the same advertisements per page, ten percent per page, etc.). In still another example, the advertisement guidance application can be used to verify that advertisements have been placed by various advertisement servers by storing the received advertisement information, domain of a web page where the advertisement was loaded, time, etc.

Moreover, the advertisement server can use the advertisement guidance application and the exchanged information for competitor blocking or competitor targeting when advertisements on a page are being served by multiple advertisement servers. For example, an advertisement server that is placing advertisements relating to American Airlines can detect other advertisements that are shown on the web page and, upon receiving information relating to the detected advertisements, determine whether to provide the American Airlines advertisement to the page. In the case where the advertisement server has been instructed to not place an American Airlines advertisement when advertisements in the same industry or same genre have been presented on the page (e.g., competitive blocking), the advertisement server can use the exchanged information to block the advertisement from being presented. In the case where the advertisement server has been instructed to target pages with advertisements in the same industry or same genre (e.g., competitive targeting), the advertisement server can use the exchanged information to pass the advertisement.

In some embodiments, the advertisement guidance application can handle conflicts based on any suitable criteria. For example, in the case of conflicting instructions (e.g., block advertisements associated with entity A and block advertisements with entity B), the advertisement guidance application can use competitive targeting or competitive blocking information based on the advertisement that was loaded first on the page. In another example, in some embodiments, the advertisement guidance application can select another advertisement for placement on the page in response to receiving conflicting instructions.

In some embodiments, the advertisement server can use the application and the exchanged information to selectively present advertisements based on client settings. For example, the client can instruct the advertisement server to only place an advertisement on a page if the other advertisements served on the page have been rated as safe advertisements by, for example, Integral Ad Science, LLC or any other suitable advertisement rating organization. Additionally or alternatively, the advertisement server can be instructed to use the application to determine whether a particular percentage of advertisements on a page are above a predetermined rating or score and, upon performing the determination, presenting the advertisements on the page.

Figure 4:
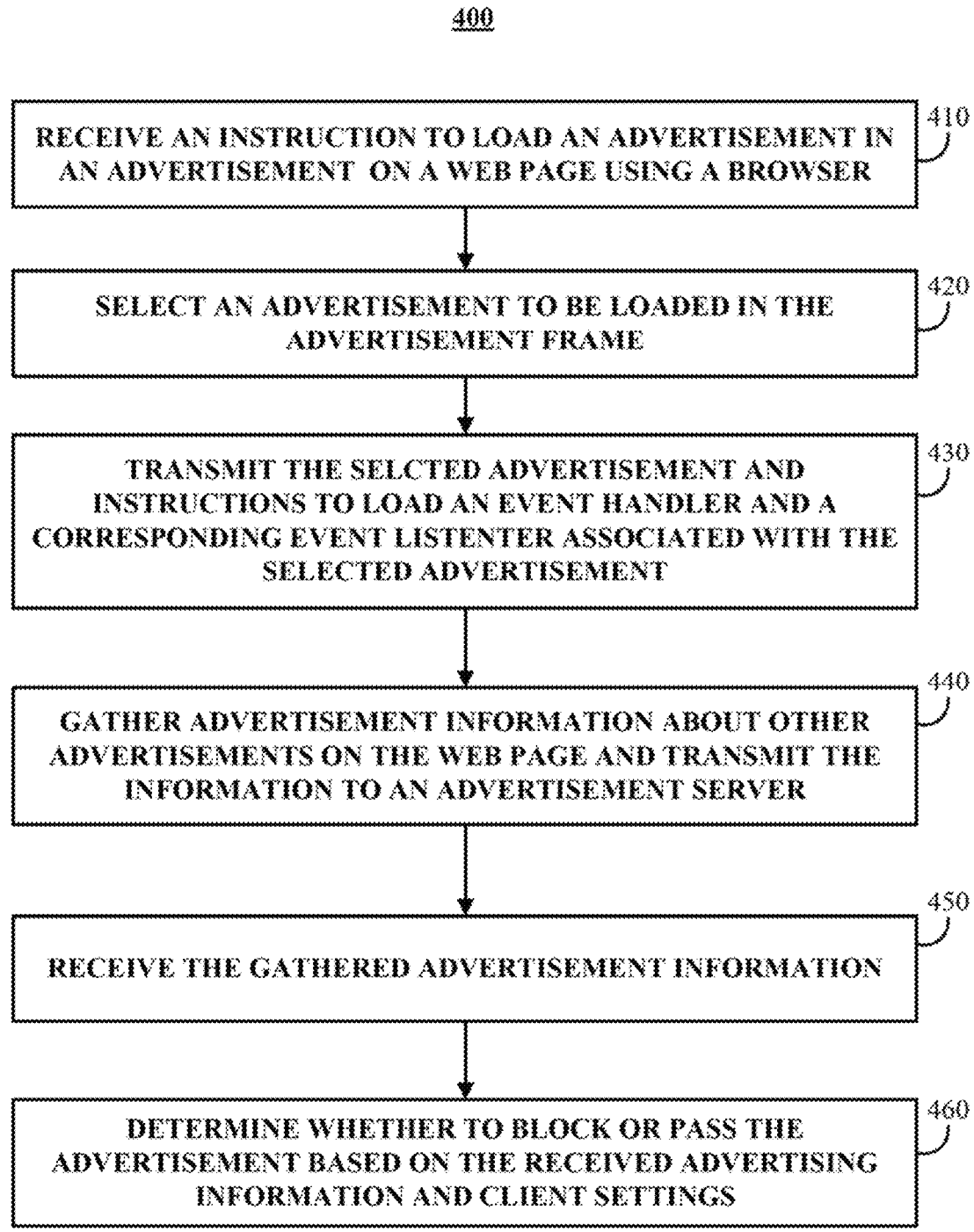
FIG. 4 shows an illustrative example of a process for detecting advertisements with advertising cues in accordance with some embodiments of the disclosed subject matter.

Turning to FIG. 4, an example of a process 400 for detecting advertisements and exchanging advertisement information is shown in accordance with some embodiments of the disclosed subject matter. As shown in FIG. 4, process 400 can begin by the advertisement guidance application receiving an instruction (or request) to load an advertisement on a web page using a browser at 410. Such receiving can be performed similarly to the receiving described above in connection with process 100 of FIG. 1. For example, the advertisement guidance application can receive a request for an advertisement from a web browser application at an advertisement server.

At 420, an advertisement to be loaded on the web page can be selected by the advertisement guidance application. Selection of an advertisement can be performed in accordance with selection of an advertisement described above in connection with process 100 of FIG. 1. For example, an advertisement can be selected based on demographic characteristics and/or psychographic characteristics of a user, content of the web page, etc.

At 430, the advertisement guidance application can transmit the selected advertisement and instructions to load an event handler and a corresponding event listener associated with the advertisement. The advertisement guidance application can also transmit information about the advertisement (e.g., advertisement metadata) to be stored in connection with the selected advertisement at 130. As described above in connection with FIG. 2, information about the advertisement can include advertiser information, campaign information, etc. The advertisement, the event handler and the corresponding event listener can all be loaded on the web page in response to the transmission of the selected advertisement and the instructions to load the event handler and the event listener.

At 440, advertisement information about other advertisements loaded on the web page can be gathered and transmitted to an advertisement server. This can be done as described above in connection with FIG. 2. For example, the advertisement can send an identification message to other frames on the web page and can receive a response identification message from other approved advertisements on the web page containing information about the other approved advertisements. The advertisement can also transmit advertisement information to the advertisement guidance application at 440.

At 450, the advertisement guidance application can receive the advertisement information sent by the advertisement at 440. For example, advertisement information can be transmitted to the advertisement server as described above in connection with FIGS. 1 and 3. More particularly, the advertisement guidance application can receive message 316-1 from advertisement 302 that includes information about advertisement 304.

At 460, the advertisement guidance application can determine whether to block or pass the advertisement based on the advertising information received at 450 and client settings related to the advertisement. For example, if the advertisement guidance application blocks the selected advertisement another advertisement can be loaded in place of the blocked advertisement. As another example, if the advertisement guidance application blocks the selected advertisement, the blocked advertisement can be replaced with a generic document (e.g., a blank document, a public domain image, etc.) or a public service announcement.

Process 400 is similar to process 100, but differs in that at 430, rather than only transmitting information about an advertisement to be loaded, as is done at 130, the advertisement is actually transmitted to the web page and loaded.

Figure 5:
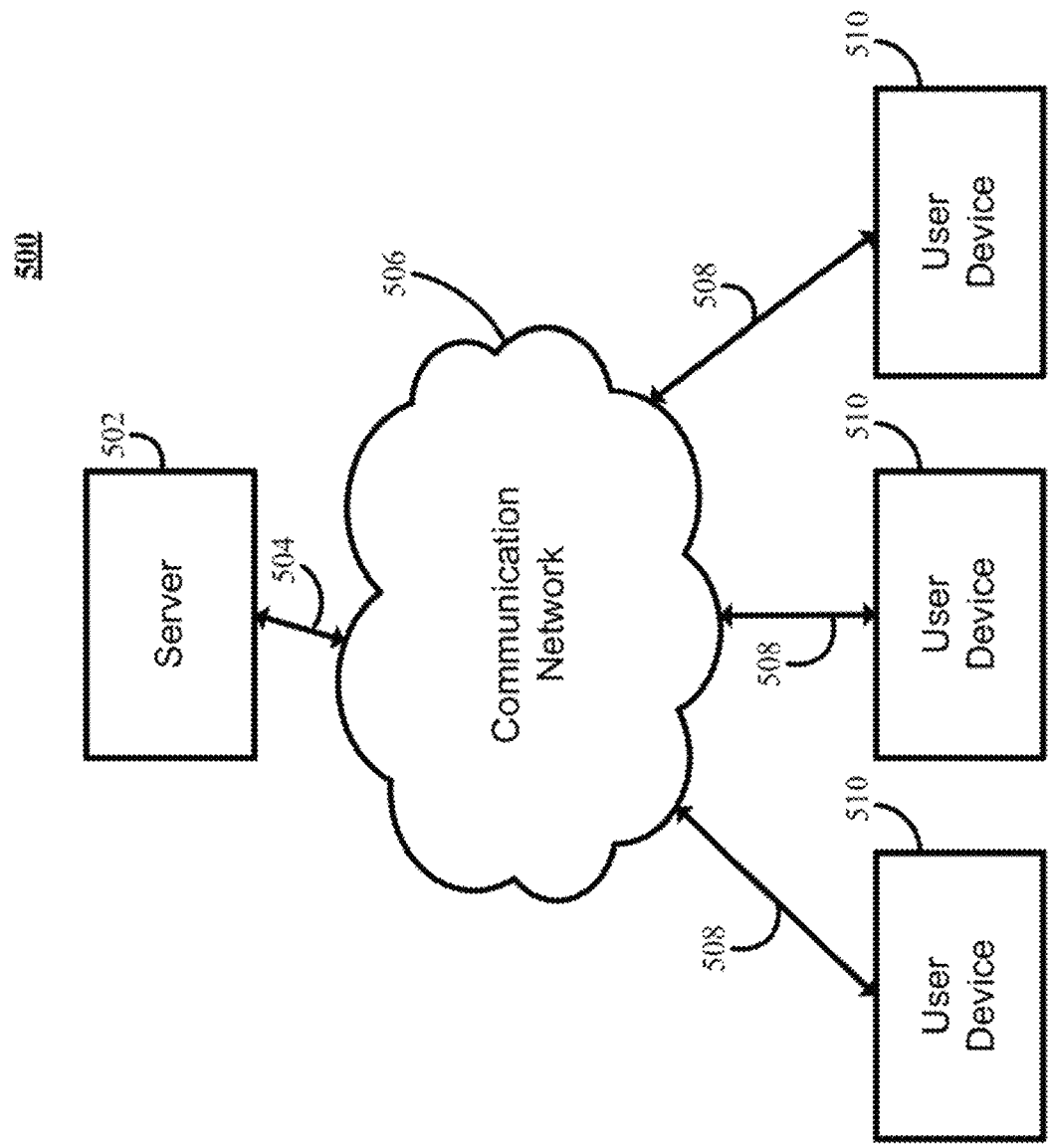
FIG. 5 shows a schematic diagram of an illustrative system suitable for implementation of an application for detecting advertisements with advertising cues in accordance with some embodiments of the disclosed subject matter.

FIG. 5 shows an example of a generalized schematic diagram of a system 500 on which the mechanisms for detecting advertisements with advertising cues described herein can be implemented as an application in accordance with some embodiments. As illustrated, system 500 can include one or more user devices 510. User devices 510 can be local to each other or remote from each other. User devices 510 can be connected by one or more communications links 508 to a communications network 506 that can be linked via a communications link 506 to a server 502.

System 500 can include one or more servers 502. Server 502 can be any suitable server for providing access to the application, such as a processor, a computer, a data processing device, or any suitable combination of such devices. For example, the application can be distributed into multiple backend components and multiple frontend components or interfaces. In a more particular example, backend components, such as data collection and data distribution can be performed on one or more servers 502. As described above, advertisement server 502 can be an advertisement server(s), a demand side platform server(s), a real-time bidding exchange server(s), etc., or any suitable combination thereof.

More particularly, for example, each of the user devices 510 and server 502 can be any of a general purpose device such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 510 can be implemented as a personal computer, a smartphone, a tablet computer, a personal data assistant (PDA), a multimedia terminal, a mobile telephone, a set-top box, a television, a game console, etc.

Communications network 506 can be any suitable computer network or combination of networks, such as, the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"). Communications links 504 and 508 can be any communications links suitable for communicating data between user devices 510 and server 502, such as network links, dial-up links, wireless links, hard-wired links, any other suitable communications links, or any suitable combination of such links. User devices 510 can enable a user to load a web page that causes features of the application to be accessed. User devices 510 and server 502 can be located at any suitable location.

Figure 6:
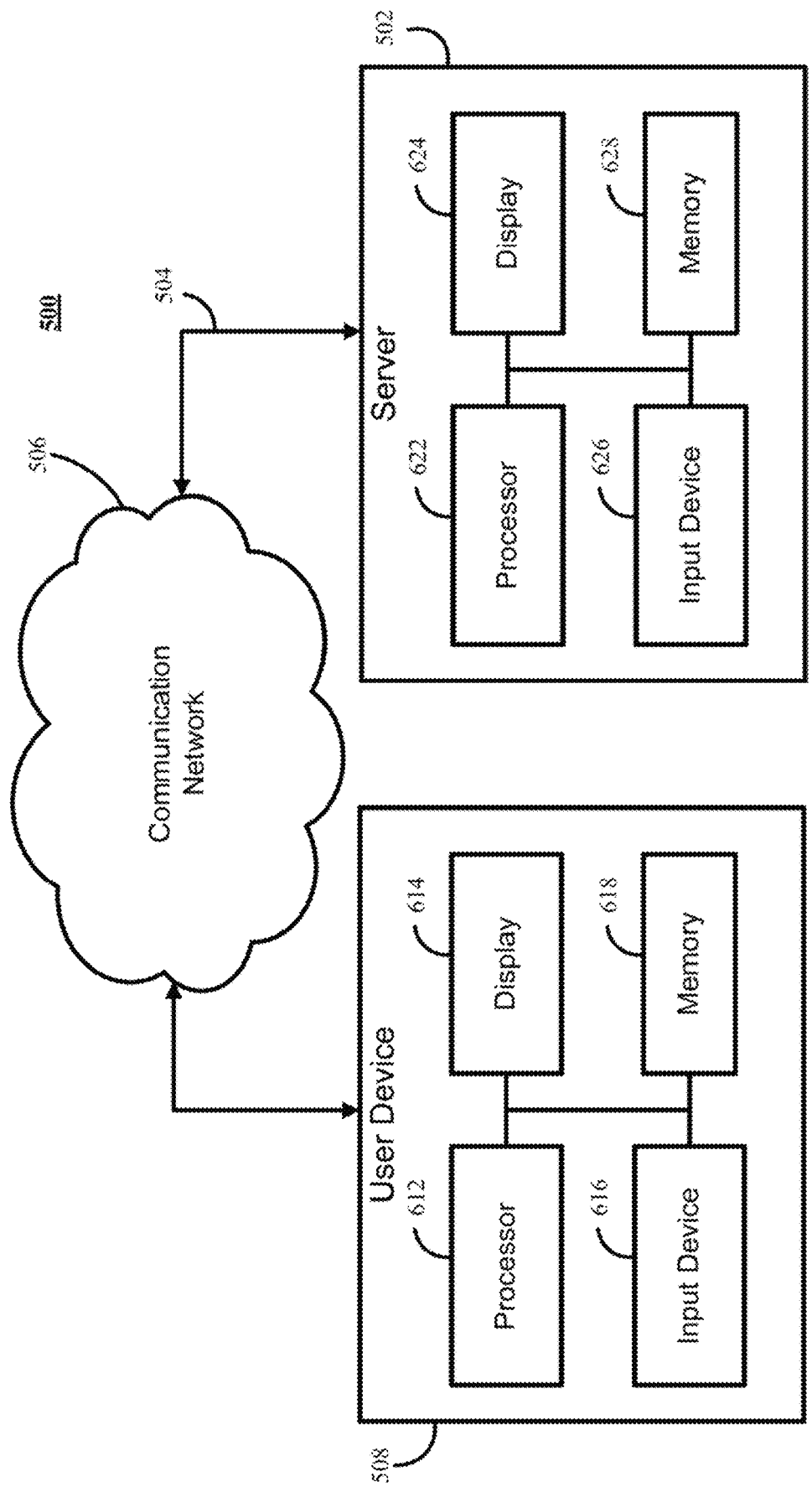
FIG. 6 shows a detailed example of the server and one of the user devices of FIG. 5 that can be used in accordance with some embodiments of the disclosed subject matter.

FIG. 6 illustrates an example of hardware 500 where the server and one of the user devices depicted in FIG. 5 are illustrated in more detail. Referring to FIG. 6, user device 510 can include a processor 612, a display 614, an input device 616, and memory 618, which can be interconnected. In some embodiments, memory 618 can include a storage device (such as a computer-readable medium) for storing a computer program for controlling processor 612.

Processor 612 can use the computer program to present on display 614 a web browser window that loads a web page with instructions to load an advertisement and/or other data received through communications link 508 and commands and values transmitted by a user of user device 510. It should also be noted that data received through communications link 508 or any other communications links can be received from any suitable source. Input device 616 can be a computer keyboard, a cursor-controller, dial, switchbank, lever, touchscreen, any other suitable input device, or any suitable combination thereof.

Server 502 can include processor 622, display 624, input device 626, and memory 628, which can be interconnected. In some embodiments, memory 628 can include a storage device for storing data received through communications link 504 or through other links, and can also receive commands and values transmitted by one or more users. The storage device can further include a server program for controlling processor 622.

In one particular embodiment, the application can include client-side software, hardware, or both. For example, the application can encompass a computer program written in a programming language recognizable by the computing device (e.g., user device, server, etc.) executing the application (e.g., via any suitable encoding, such as Java, C, Objective-C, C++, C#, Javascript, Adobe Flash, ActionScript, Visual Basic, HyperText Markup Language ("HTML"), Dynamic HyperText Markup Language ("DHTML"), Extensible Markup Language ("XML"), Java-Server Pages ("JSP"), Active Server Pages ("ASP"), Cold Fusion, or any other suitable approaches).

Figure 7:
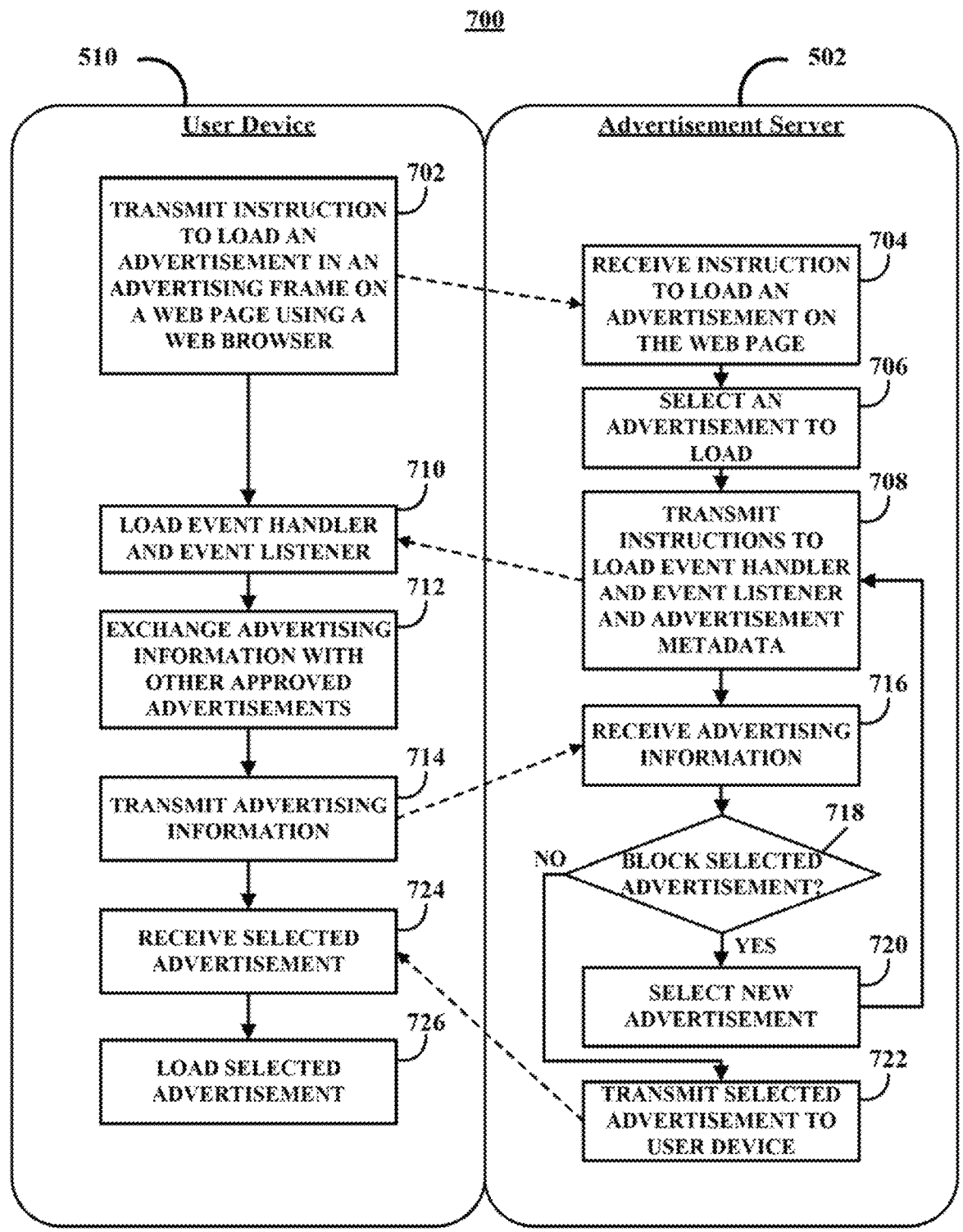
FIG. 7 shows a diagram illustrating an example of a data flow that can be used in processes of FIGS. 1 and 2 in accordance with some embodiments of the disclosed subject matter.

FIG. 7 shows an example of a data flow 700 between user device 510 and server 502 in accordance with some embodiments of the disclosed subject matter. In the example of FIG. 7, server 502 can be an advertising server. At 702, an instruction (or request) to load an advertisement on a web page can be transmitted to advertisement server 502 using a web browser running on user device 510. For example, a user can instruct the web browser to load a web page which can cause the web browser to request an advertisement to load on the web page. In one particular example, a user using user device 510 can select a link to example.com, which can cause a web browser on user device 510 to begin loading example.com. Example.com can contain a frame (e.g., an iframe) that contains instructions (such as an advertisement call, an advertisement tag, etc.) that instruct the web browser to request an advertisement from an advertisement server. The web browser in this example can send an instruction (or request) to an advertisement server specified by the instructions contained in the frame.

At 704, the advertisement guidance application running on advertisement server 502 can receive the instruction to load an advertisement on the web page. At 706, the advertisement guidance application can select an advertisement to load in response to receiving the instruction (or request) to load an advertisement on the web page. For example, as described above an advertisement can be selected based on the content of the web page, demographic or psychographic characteristics of the user, etc. In one particular example, an advertisement for American Airlines can be selected as the selected advertisement based on the user's demographic characteristics and the content of example.com.

At 708, the advertisement guidance application can cause advertising server 502 to transmit instructions to user device 510 to load an event handler and a corresponding event listener in the advertising frame on the web page. The advertisement guidance application can also cause advertising server 502 to transmit advertisement metadata (e.g., information about the advertisement) for the selected advertisement to user device 510 for use in exchanging advertisement information. In one particular example, the advertisement guidance application transmits instructions for the web browser running on user device 510 that loaded (or is still loading) example.com to load an event handler and event listener in the frame that contained the instructions to request an advertisement. In this example, the advertisement guidance application can also transmit metadata related to the selected advertisement, which in this case is an advertisement for American Airlines.

At 710, the web browser running on user device 510 can load an event handler and a corresponding event listener in the advertising frame that caused the advertisement to be requested.

At 712, the advertising frame, using the event handler and the event listener, can exchange advertising information with other advertisements and/or advertising frames on the web page. Exchanging advertising information can be performed as described above regarding gathering advertising information in connection with FIGS. 1 to 3. In one particular example, the frame that requested the advertisement from advertisement server 502 (e.g., the frame which will load the American Airlines advertisement if that advertisement is not blocked by the advertisement guidance application) can send an identification message to other frames on example.com (as loaded by the web browser running on user device 510). In such an example, the advertisement information gathered can contain information about one other advertisement on the web page loaded by the web browser running on user device 510.

At 714, the advertising frame can cause the web browser running on user device 510 to transmit the advertisement information (e.g., advertisement metadata) relating to other advertisements loaded (or selected to be loaded) on the web page. In one particular example, information related to one other advertisement on the web page can be transmitted to advertising server 502.

At 716, advertising server 502 can receive the advertising information from user device 510 and can use the advertisement information to determine whether to block the selected advertisement from loading on the web page at 718. The advertisement guidance application can determine whether to block the selected advertisement at 718 as described above in connection with FIG. 1. For example, if the advertisement information received at 716 indicates that an advertisement loaded on the web page is an advertisement from a competitor and the client has set up the advertisement guidance application for competitive blocking, the advertisement guidance application can determine that the selected advertisement should be blocked from loading on the web page. In one particular example, if the other advertisement on example.com is an advertisement for JetBlue Airways and the client associated with the selected advertisement (e.g., American Airlines, a party affiliated with American Airlines, etc.) has set the advertisement guidance application to perform competitive blocking, the advertisement guidance application can determine that the selected advertisement (e.g., the American Airlines advertisement) should be blocked. Changing the example slightly, if the client associated with the selected advertisement has set the advertisement guidance application to perform competitive targeting, the advertisement guidance application can determine that the selected advertisement (e.g., the American Airlines advertisement) should be passed (e.g., not blocked).

If the advertisement guidance application determines that the selected advertisement should be blocked ("YES" at 718), the advertisement guidance application can select a new advertisement at 720 and return to 708. Otherwise, if the advertisement guidance application determines that the selected advertisement should be passed (e.g., should not be blocked) ("NO" at 718), the advertisement guidance application can cause advertisement server 502 to transmit the selected advertisement to user device 510.

At 724, user device 510 can receive the selected advertisement and the web browser can load the selected advertisement in the web page at 726. In one particular example, the advertisement guidance application can cause the advertisement server 502 to transmit the selected advertisement (e.g., the American Airlines advertisement) to user device 510 which can load the advertisement in example.com using the web browser.

Figure 8:
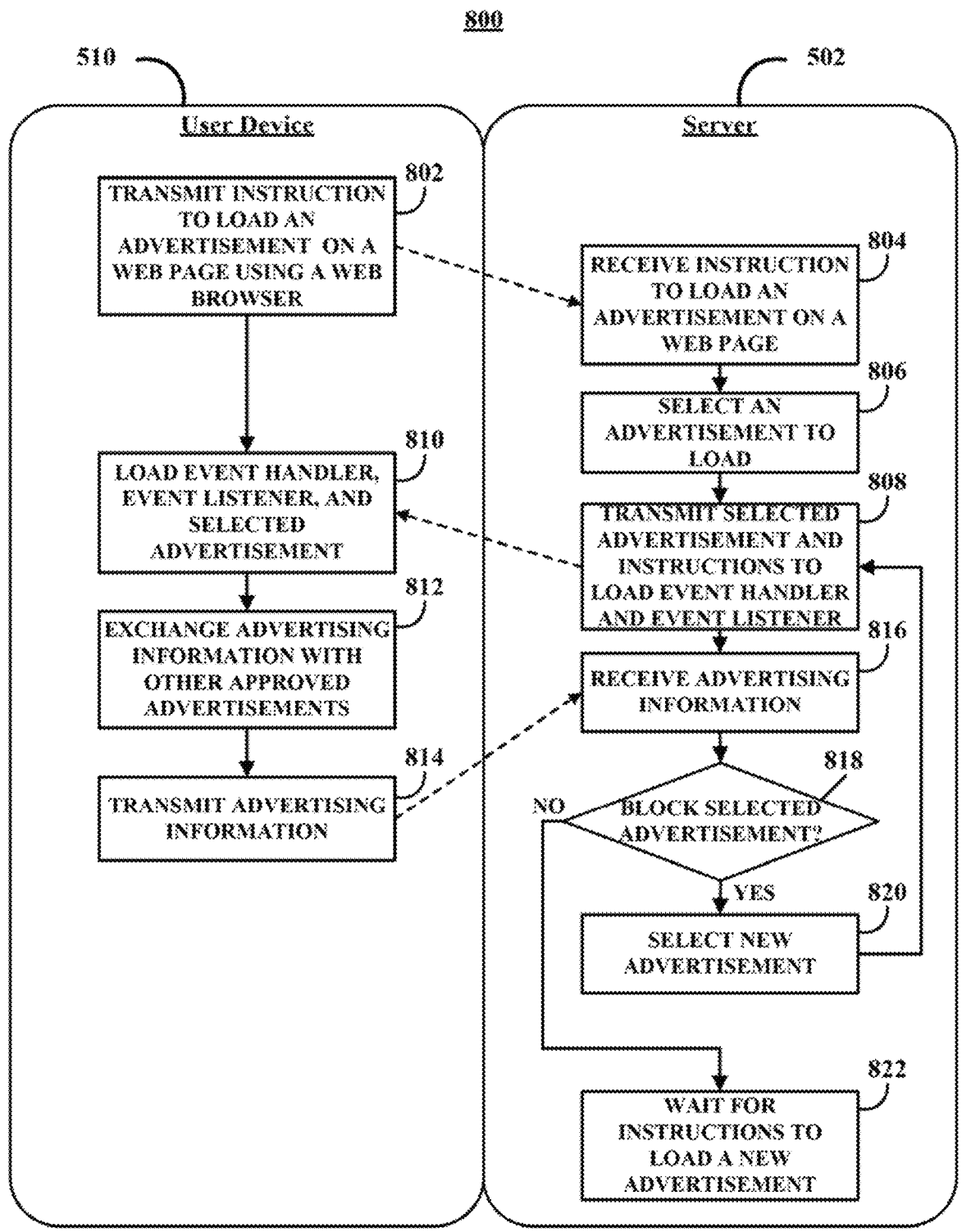
FIG. 8 shows a diagram illustrating an example of a data flow that can be used in processes of FIGS. 2 and 5 in accordance with some embodiments of the disclosed subject matter.

FIG. 8 shows an example of a data flow 800 between user device 510 and server 502 in accordance with some embodiments of the disclosed subject matter. In the example of FIG. 8, server 502 can be an advertising server. At 802, an instruction (or request) to load an advertisement on a web page can be transmitted to advertisement server 502 using a web browser running on user device 510. For example, a user can instruct the web browser to load a web page and the web page can cause the web browser to request an advertisement to load on the web page. In one particular example, a user using user device 510 can select a link to example-.com, which can cause a web browser on user device 510 to begin loading example.com. Example.com can contain a frame (e.g., an iframe) that contains instructions (such as an advertisement call, an advertisement tag, etc.) that instruct the web browser to request an advertisement from an advertisement server. The web browser in this example can send an instruction (or request) to an advertisement server specified by the instructions contained in the frame.

At 804, the advertisement guidance application running on advertisement server 502 can receive the instruction to load an advertisement on the web page. At 806, the advertisement guidance application can select an advertisement to load in response to receiving the instruction (or request) to load an advertisement on the web page. For example, as described above an advertisement can be selected based on the content of the web page, demographic or psychographic characteristics of the user, etc. In one particular example, an advertisement for American Airlines can be selected as the selected advertisement based on the user's demographic characteristics and the content of example.com.

At 808, the advertisement guidance application can cause advertising server 502 to transmit the selected advertisement and instructions to load an event handler and a corresponding event listener with the selected advertisement on the web page to user device 510. The advertisement guidance application can also cause advertising server 502 to transmit advertisement metadata (e.g., information about the advertisement) for the selected advertisement to user device 510. In one particular example, the advertisement guidance application transmits the selected advertisement (e.g., the American Airlines advertisement) and instructions for the web browser running on user device 510 that loaded (or is loading) example.com to load an event handler and event listener in the frame that contained the instructions to request an advertisement. In this example, the advertisement guidance application can also transmit metadata related to the selected advertisement, which in this case is an advertisement for American Airlines.

At 810, the web browser running on user device 510 can load an event handler and a corresponding event listener with the advertisement. In one particular example, the advertisement for American Airlines can be loaded on example.com by the web browser, and an event handler and a corresponding event listener can be loaded in associated with the American Airlines advertisement.

At 812, the advertisement, using the event handler and the event listener, can exchange advertising information with other advertisements and/or advertising frames on the web page. Exchanging advertising information can be performed as described above regarding gathering advertising information in connection with FIGS. 1, 3 and/or 4. In one particular example, the selected advertisement (e.g., the American Airlines advertisement) can send an identification message to other frames on example.com in the web browser. In such an example, the advertisement information can contain information about one other advertisement (e.g., an advertisement for JetBlue Airways, a competitor of American Airlines) on the web page loaded by the web browser running on user device 510.

At 814, the advertisement can cause the web browser running on user device 510 to transmit the advertisement information (e.g., advertisement metadata) relating to other advertisements loaded on the web page. In one particular example, information related to one other advertisement (e.g., a JetBlue Airways advertisement) on the web page can be transmitted to advertising server 502.

At 816, advertising server 502 can receive the advertising information from user device 510 and can use the advertisement information to determine whether to block the selected advertisement on the web page at 818. The advertisement guidance application can determine whether to block the selected advertisement at 818 as described above in connection with FIG. 4. For example, if the advertisement information received at 816 indicates that an advertisement loaded on the web page is an advertisement from a competitor and if the client has set up the advertisement guidance application for competitive blocking, the advertisement guidance application can determine that the selected advertisement should be blocked on the web page.

In one particular example, if the other advertisement on example.com is an advertisement for JetBlue Airways and the client associated with the selected advertisement (e.g., American Airlines, a party affiliated with American Airlines, etc.) has set the advertisement guidance application to perform competitive blocking, the advertisement guidance application can determine that the selected advertisement (e.g., the American Airlines advertisement) should be blocked. Changing the example slightly, if the client associated with the selected advertisement has set the advertisement guidance application to perform competitive targeting, the advertisement guidance application can determine that the selected advertisement (e.g., the American Airlines advertisement) should be passed (e.g., not blocked). In such an example, a new advertisement can be selected at 820 and at 808 the advertisement guidance application can cause the newly selected advertisement to be transmitted by advertisement server 502 to user device 510 to be loaded in example.com by the web browser running on user device 510.

If the advertisement guidance application determines that the selected advertisement should be blocked ("YES" at 818), the advertisement guidance application can select a new advertisement at 820 and return to 808. Otherwise, if the advertisement guidance application determines that the selected advertisement should be passed (e.g., should not be blocked) ("NO" at 818), the advertisement guidance application can wait for an instruction (or request) to load a new advertisement.

At 810, if the selected advertisement is blocked and a new advertisement is selected and transmitted by advertising server 502, user device 510 can receive the newly selected advertisement and the web browser can load the newly selected advertisement in the web page at 810. In one particular example, the advertisement guidance application can cause the advertisement server 502 to transmit a newly selected advertisement (e.g., an advertisement for Burger King) to user device 510 which can load the advertisement in example.com using the web browser.

Figure 9:
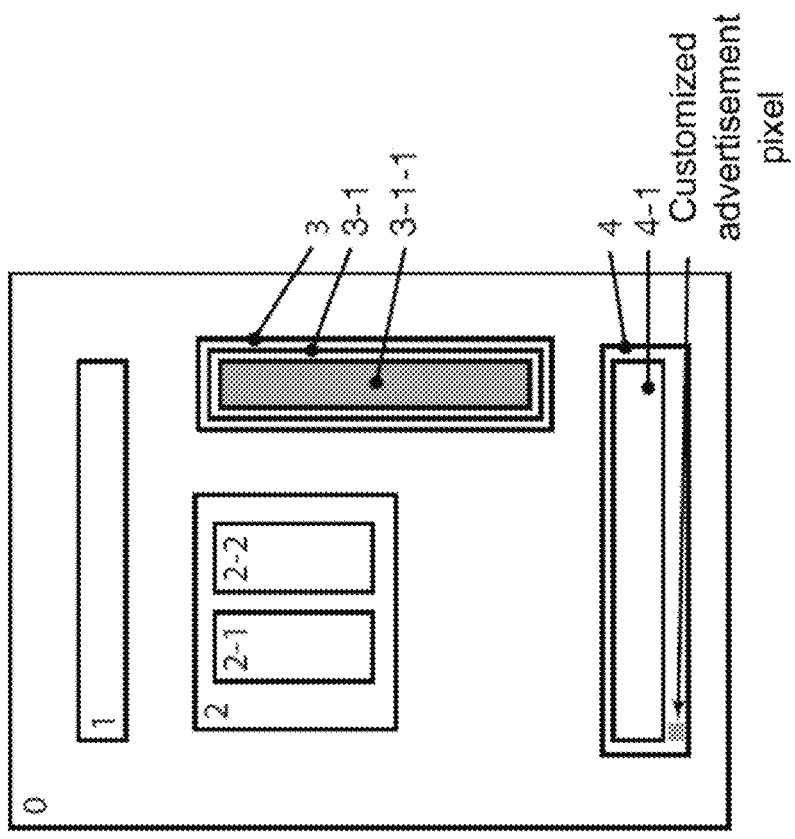
FIG. 9 shows an illustrative example of a layout of frames on a web page in accordance with some embodiments of the disclosed subject matter.

In some embodiments, the advertisement guidance application can use collected information relating to the previously transmitted and/or received advertisement identification messages to detect the frames associated with a web page on which an advertisement selected to be loaded or on which the selected advertisement is loaded without invoking the event listener and/or event handler. Based on this detection of advertisement identification messages, the application can generate a structural accounting of the frames on a web page. For example, as shown in FIG. 9, in addition to transmitting messages to the frames on a webpage, the application can generate a structural accounting of the frames and indicate which frame or frames contains an advertisement identification message (e.g., "I am an approved advertisement"). The generated accounting can include, for example, the base-level page (identified as 0 in FIG. 9), a non-nested advertisement (identified as 1 in FIG. 9), a widget (identified as 2 in FIG. 9) with two sub-frames (identified as 2-1 and 2-2 in FIG. 9), a three-level nested advertisement with an advertisement identification message (identified as 3, 3-1, and 3-1-1 in FIG. 9), and a two-level nested advertisement with monitoring code (identified as 4 and 4-1 in FIG. 9).

Figure 10:
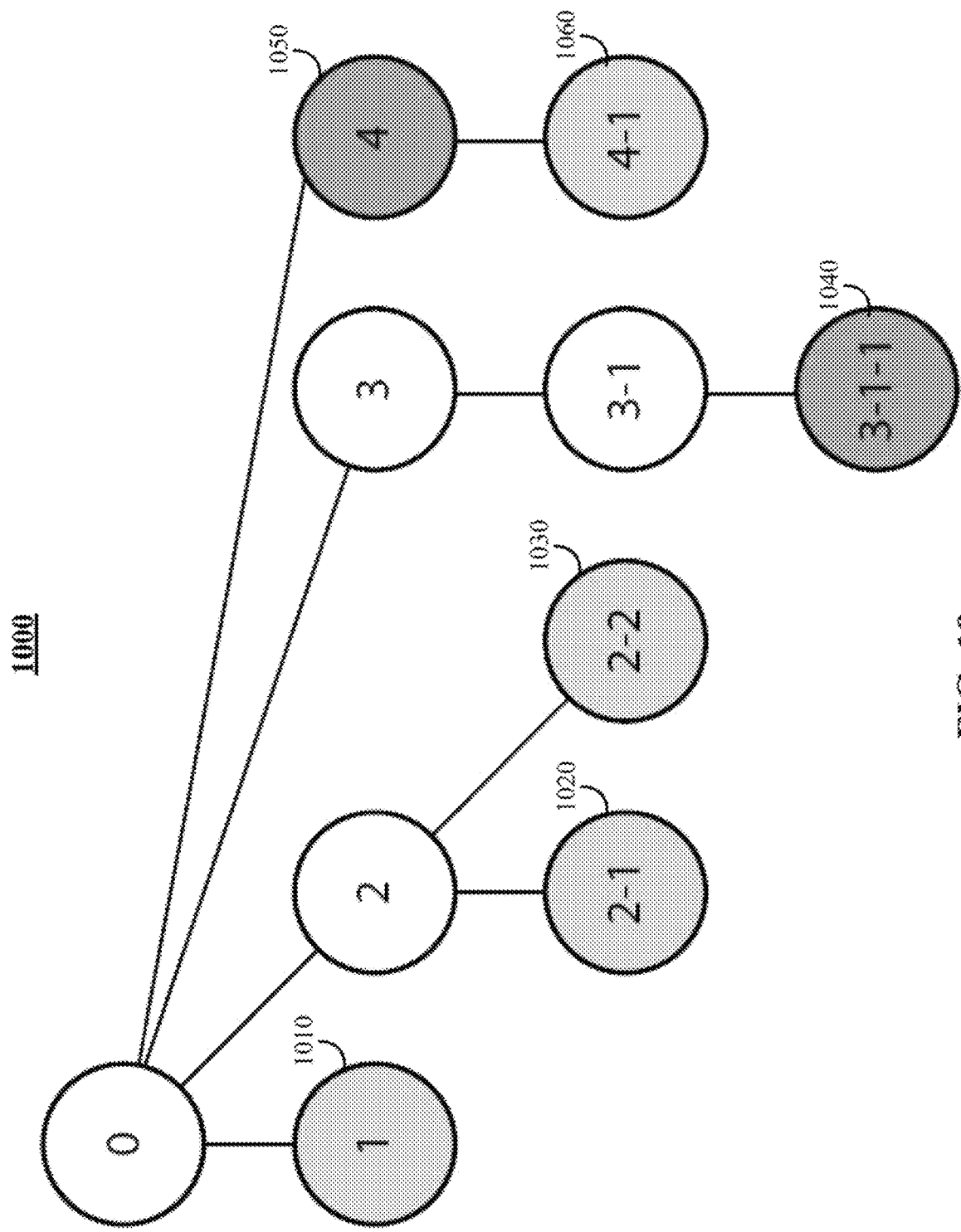
FIG. 10 shows an illustrative example of a structure of frames on the web page illustrated in FIG. 9 shown in a tree structure according to some embodiments of the disclosed subject matter.

In some embodiments, the application can represent the accounting of the frames on the web page in a tree structure. For example, as shown in FIG. 10, the application can display a tree that includes frames and nested frames. The generated accounting can indicate the lowest leaf on each branch of the tree—e.g., 1010, 1020, 1030, 1040, and 1060. The generated accounting can also indicate which leaves include an advertisement identification message (e.g., "I am an approved advertisement")—e.g., 1040 and 1050. In a more particular example, the application can generate the tree structure concurrently while recursively walking through the frames of the web page. That is, in response to transmitting messages to or receiving a message(s) from the frames of the web page, the frame accounting can be updated to include additional frames and/or nested frames.

In some embodiments, the application can transmit information relating to the accounting of the frames on the web page to an advertisement server or any other suitable computing device. For example, the application can transmit a period-separated list of leaves. For example, from the three-level nested advertisement with the advertisement identification message (identified as 3, 3-1, and 3-1-1 in FIG. 9), the application can transmit the following message:

1.2-1.2-2.3-1-1*.4-1

The period-separated list of leaves provides the lowest level for each branch of the tree and the asterisk ("*") indicates the frame within the list that contains the advertisement identification message. In another example, from the two-level nested advertisement with monitoring code (identified as 4 and 4-1 in FIG. 9), the application can transmit the following message:

1.2-1.2-2.3-1-1.4*.4-1

However, any suitable syntax for transmitting information relating to the account of the frames on the webpage can be used.

Upon receiving a frame accounting, a period-separated list of leaves, or any other suitable representation of the frames associated with a page, the application can generate user engagement metrics for presenting to an advertiser. For example, based on the frame structural accounting, the application may determine the number of approved advertisements that appear on the web page. In another example, the application can calculate a value corresponding to page clutter based on the number of frames or number of nested frames on the webpage. More particularly, the application can determine the likelihood that an advertisement is viewed by a browser on a web page based on page clutter. In yet another example, the application may calculate the in-view probability or the likelihood of an advertisement being in view during a user session given the complexity or clutter of a webpage. Similarly, based on page clutter or any other suitable information derived from the frame accounting, the application can determine an in-view on load probability, which determines the likelihood of an advertisement being in view upon page load, or the in-view on unload probability, which determines the likelihood of an advertisement being in view when a page is unloaded.

Accordingly, methods, systems, and media for detecting advertisements using advertising cues are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1, 2, 4, 7 and 8 can be executed or performed in any order or sequence not limited to the order and sequence shown and described in the figures. Also, some of the above steps of the processes of FIGS. 1, 2, 4, 7 and 8 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed:

1. A method for detecting advertisements, the method comprising:

receiving, using a hardware processor of a server, an advertisement request for a first frame from a web browser executing on a computing device that is loading a web page comprising a plurality of frames including the first frame;

selecting, using the hardware processor, a first advertisement from a plurality of advertisements to be placed in the first frame of the plurality of frames on the web page in response to receiving the advertisement request;

causing, using the hardware processor of the server, a first event listener to be loaded on the web browser executed by the computing device in association with the first frame, wherein the first event listener listens for messages transmitted from one or more frames other than the first frame of the plurality of frames on the web page and that receives advertisement information associated with one or more advertisements in the one or more frames other than the first frame of the plurality of frames on the web page;

causing, using the hardware processor of the server, advertisement information associated with the first advertisement to be transmitted to at least a second frame of the plurality of frames;

communicating, using the hardware processor of the server, with the first event listener to receive advertisement information received by the first event listener that includes at least advertisement information associated with a second advertisement in the second frame of the plurality of frames that was transmitted to the first frame;

communicating, using the hardware processor of the server, with a second event listener associated with the second frame of the plurality of frames to receive advertisement information received by the second event listener loaded on the web browser executed by the computing device in association with the second frame that includes at least the advertisement information associated with the first advertisement in the first frame of the plurality of frames that was transmitted to the second frame, wherein the second event listener listens for messages transmitted from one or more frames other than the second frame of the plurality of frames on the web page; and retrieving, using the hardware processor of the server, a third advertisement from the plurality of advertisements and causing the third advertisement from the plurality of advertisements to be presented on the web page in the first frame in place of the first advertisement based on the advertisement information from the first event listener and the second event listener.

2. The method of claim 1, wherein the first frame is associated with a first domain that is different from a domain of the web page.

3. The method of claim 2, wherein the second frame is associated with a second domain that is different from the domain of the web page and different from the first domain.

4. The method of claim 1, wherein the method further comprises determining whether to present the first advertisement or the third advertisement from the plurality of advertisements in the first frame of the web page based on the received advertisement information from the first event listener and the second event listener and client settings related to the first advertisement.

5. The method of claim 4, wherein the method further comprises, in response to determining that the first advertisement should not be presented in the frame of the web page, inhibiting the first advertisement from being loaded on the web page.

6. The method of claim 1, wherein the received advertisement information includes at least one of: advertiser identification information, campaign identification information, advertisement placement information, and information relating to whether a response was received from advertisements on the web page.

7. The method of claim 1, wherein the method further comprises transmitting an identification message that identifies the first advertisement to a first event handler, wherein, in response to the first event listener receiving the advertisement information from the second frame, the first event handler causes a response that includes information from the identification message to be transmitted to the second frame.

8. The method of claim 1, wherein the method further comprises causing a message transmitter to be loaded in association with the first frame that transmits the advertisement information associated with the first advertisement to frames other than the first frame and that recursively walks through each of the plurality of frames on the web page other than the first frame and transmits the advertisement information associated with the first advertisement to each of the plurality of frames other than the first frame.

9. The method of claim 1, wherein the method further comprises determining approved advertisements associated with the web page based on the received advertisement information.

10. The method of claim 1, wherein the method further comprises causing an unload handler to be loaded in association with the first frame that collects additional advertisement information from additional advertisements that loaded later in time than the first advertisement and transmits the additional advertisement information to the server.

11. A system for detecting advertisements, the system comprising:

a hardware processor of a server that is programmed to:
receive an advertisement request for a first frame from a web browser executing on a computing device that is loading a web page comprising a plurality of frames including the first frame;

select a first advertisement from a plurality of advertisements to be placed in the first frame of the plurality of frames on the web page in response to receiving the advertisement request;

cause a first event listener to be loaded on the web browser executed by the computing device in association with the first frame, wherein the first event listener listens for messages transmitted from one or more frames other than the first frame of the plurality of frames on the web page and that receives advertisement information associated with one or more advertisements in the one or more frames other than the first frame of the plurality of frames on the web page;

cause advertisement information associated with the first advertisement to be transmitted to at least a second frame of the plurality of frames;

communicate with the first event listener to receive advertisement information received by the first event listener that includes at least advertisement information associated with a second advertisement in the second frame of the plurality of frames that was transmitted to the first frame;

communicate with a second event listener associated with the second frame of the plurality of frames to receive advertisement information received by the second event listener loaded on the web browser executed by the computing device in association with the second frame that includes at least the advertisement information associated with the first advertisement in the first frame of the plurality of frames that was transmitted to the second frame, wherein the second event listener listens for messages transmitted from one or more frames other than the second frame of the plurality of frames on the web page; and retrieve a third advertisement from the plurality of advertisements and causing the third advertisement from the plurality of advertisements to be presented on the web page in the first frame in place of the first advertisement based on the advertisement information from the first event listener and the second event listener.

12. The system of claim 11, wherein the first frame is associated with a first domain that is different from a domain of the web page.

13. The system of claim 12, wherein the second frame is associated with a second domain that is different from the domain of the web page and different from the first domain.

14. The system of claim 11, wherein the hardware processor is further programmed to determine whether to present the first advertisement or the third advertisement from the plurality of advertisements in the first frame of the web page based on the received advertisement information from the first event listener and the second event listener and client settings related to the first advertisement.

15. The system of claim 14, wherein the hardware processor is further programmed to, in response to determining that the first advertisement should not be presented in the frame of the web page, inhibit the first advertisement from being loaded on the web page.

16. The system of claim 11, wherein the received advertisement information includes at least one of: advertiser identification information, campaign identification information, advertisement placement information, and information relating to whether a response was received from advertisements on the web page.

17. The system of claim 11, wherein the hardware processor is further programmed to transmit an identification message that identifies the first advertisement to a first event handler, wherein, in response to the first event listener receiving the advertisement information from the second frame, the first event handler causes a response that includes information from the identification message to be transmitted to the second frame.

18. The system of claim 11, wherein the hardware processor is further programmed to cause a message transmitter to be loaded in association with the first frame that transmits the advertisement information associated with the first advertisement to frames other than the first frame and that recursively walks through each of the plurality of frames on the web page other than the first frame and transmits the advertisement information associated with the first advertisement to each of the plurality of frames other than the first frame.

19. The system of claim 11, wherein the hardware processor is further programmed to determine approved advertisements associated with the web page based on the received advertisement information.

20. The system of claim 11, wherein the method further comprises causing an unload handler to be loaded in association with the first frame that collects additional advertisement information from additional advertisements that loaded later in time than the first advertisement and transmits the additional advertisement information to the server.

* * * * *